(12) United States Patent
Roberts et al.

(10) Patent No.: US 6,220,401 B1
(45) Date of Patent: Apr. 24, 2001

(54) BRAKE AND ACTUATOR ASSEMBLY

(75) Inventors: Paul Roberts; Roy L Morris; Peter G Sturgess, all of Newport (GB)

(73) Assignee: Lucas Industries plc (GB)

( * ) Notice: Subject to any disclaimer, the term of this patent is extended or adjusted under 35 U.S.C. 154(b) by 0 days.

(21) Appl. No.: 09/043,804

(22) PCT Filed: Jul. 10, 1996

(86) PCT No.: PCT/GB96/02428

§ 371 Date: Mar. 25, 1998

§ 102(e) Date: Mar. 25, 1998

(87) PCT Pub. No.: WO97/13987

PCT Pub. Date: Apr. 17, 1997

(30) Foreign Application Priority Data

Oct. 11, 1995 (GB) .................................................. 9520753

(51) Int. Cl.[7] ..................................................... F16D 55/08

(52) U.S. Cl. ............................ 188/72.9; 92/168; 277/549

(58) Field of Search .................................. 188/72.9, 72.1; 92/62, 63, 130 A, 96, 101, 168; 277/549, 917, 500

(56) References Cited

U.S. PATENT DOCUMENTS

| | | | |
|---|---|---|---|
| 3,395,584 | * 8/1968 | Cox et al. | 188/72.1 X |
| 4,116,115 | 9/1978 | Gross et al. | |
| 4,222,310 | * 9/1980 | Garrett et al. | 92/168 X |
| 5,392,691 | * 2/1995 | Schultz | 92/168 |

FOREIGN PATENT DOCUMENTS

| | | |
|---|---|---|
| 0 012 024 | 6/1980 | (EP) . |
| 0 740 085 | 10/1996 | (EP) . |

* cited by examiner

*Primary Examiner*—Robert J Oberleitner
*Assistant Examiner*—Pamela J. Rodriguez
(74) *Attorney, Agent, or Firm*—Andrus, Sceales, Starke & Sawall

(57) ABSTRACT

A brake and actuator assembly includes a brake housing (4), an actuator device (6) mounted on the housing, the actuator having a force transmission element (7) extending through an opening (8) in the housing and cooperating with an actuating member (10) of the brake within the housing. A seal (12) is arranged to seal around both the opening (8) and element (7) whilst permitting the latter to move in a direction longitudinally of the element for brake actuation. The sealing element has a portion (14A) arranged for sealing engagement with the member (10) at least when that member is in its inoperative rest position.

6 Claims, 3 Drawing Sheets

BRAKE AND ACTUATOR ASSEMBLY

This invention relates to a brake and actuator assembly in which the actuator, typically of the air-operated type, is carried on the brake housing, and a force transmission element of the actuator extends through an opening in the housing and cooperates with an actuating member of the brake, usually in the form of a pivoted lever, a seal being provided between the housing and the force transmission element and serving to minimise the ingress of foreign material into the housing.

A problem with some conventional seals in assemblies of the aforesaid kind is that failure of the seal in use may result in air entering the brake housing. Moreover, when the actuator is removed from the housing, as for servicing for example, sealing of the housing opening from the surrounding atmosphere can be compromised, resulting in contamination of the housing by moisture, dirt or other foreign material.

An object of the invention is to provide an improved brake and actuator assembly in which the aforesaid problems are minimised or avoided, as well as an improved seal to form part of the aforesaid assembly in use.

According to the present invention, a brake and actuator assembly comprises a brake housing, an actuator device mounted on the housing, the actuator having a force transmission element extending through an opening in the housing and cooperating with an actuating member of the brake within the housing, the assembly incorporating a seal carried by the housing in a position such that it seals around both the opening and the force transmission element whilst permitting the latter to move in a direction longitudinally of the element for brake actuation, the seal having a portion arranged for sealing engagement with the brake actuating member at least when the member is in its inoperative rest position.

Preferably, the seal is such that it also permits the element limited angular movement whilst continuing to seal around the opening and element.

The seal may conveniently have a relatively stiff inner rim defining an opening which receives the transmission element in sliding sealing relationship, and a relatively stiff outer rim which seals around the housing opening, the inner and outer rims being interconnected by one or more relatively flexible portions which permit the element limited angular movement while the seal continues to seal around the opening and element.

The invention will now be described, by way of example, with reference to the accompanying drawings in which.

The invention is illustrated for convenience, in relation to a vehicle disc brake, but its use with other types of brake is not excluded.

Figure 1:
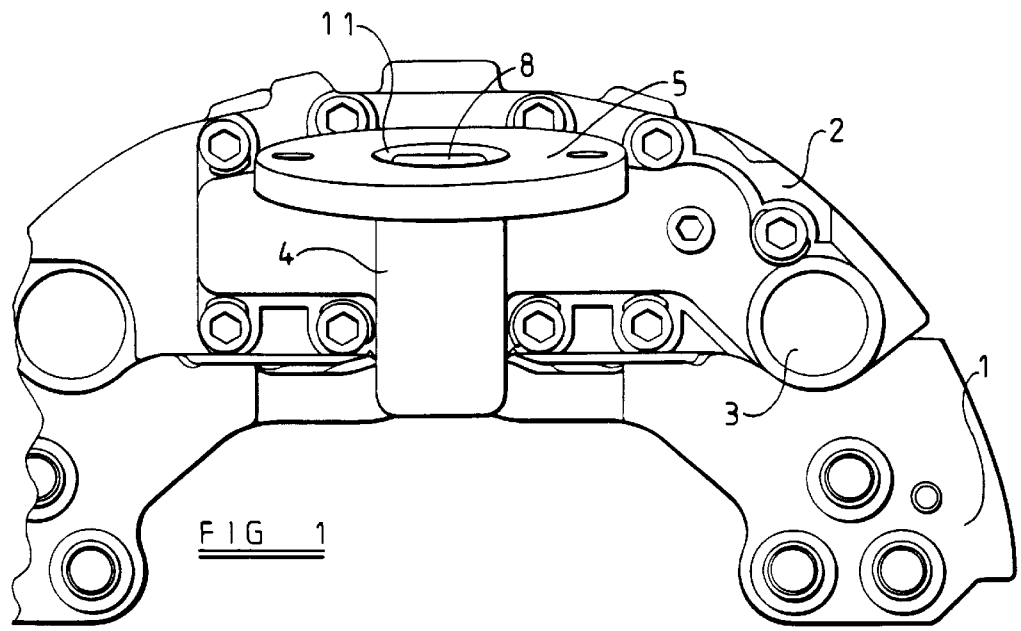
FIG. 1 is an end view of one form of a disc brake forming part of the brake and actuator assembly of the invention, with the actuator removed.
Figure 2:
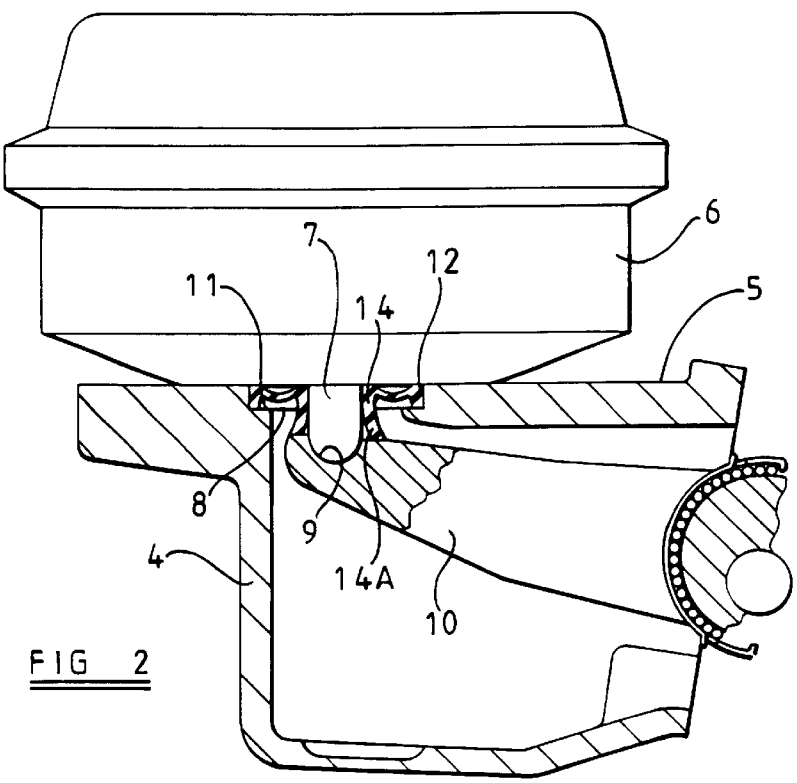
FIG. 2 is a part sectional view of the brake and actuator assembly of the invention with part of the brake omitted.

The disc brake illustrated in FIG. 1 has a carrier 1 for fixing, in use, to a stationary part of a vehicle, and a caliper 2 slidably mounted relative to the carrier 1 by way of pins 3. The internal details of the brake and its mode of operation are described, for example, in WO93/22597 and require no further description here. The carrier 1 has secured thereto, or integral therewith, a support member forming part of a brake housing 4 and provided with a circular flange 5 forming the upper surface thereof which is intended to have secured thereon an actuator device, such as an air actuator. The actuator device, designated 6, can be seen in FIG. 2 with a force transmission rod 7 thereof extending through an opening 8 in the flange 5 to engage within a recess 9 formed at the end of a brake actuating lever 10. The housing is provided with a shoulder 11 surrounding the opening 8 and this supports a seal 12 forced firmly into the opening in sealing engagement against the adjacent peripheral surface thereof. The seal also surrounds the rod 7, forming a sliding seal against the outer surface of the latter.

Figure 3:
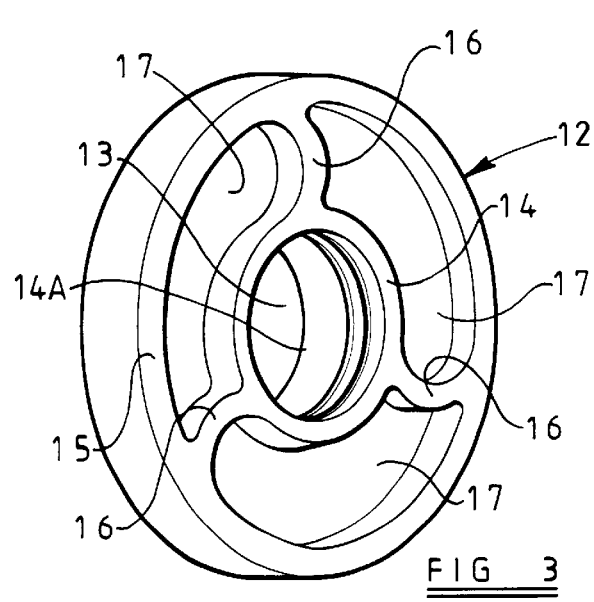
FIG. 3 is an enlarged perspective view of one form of a seal forming part of the brake and actuator assembly of the invention.
Figure 4:
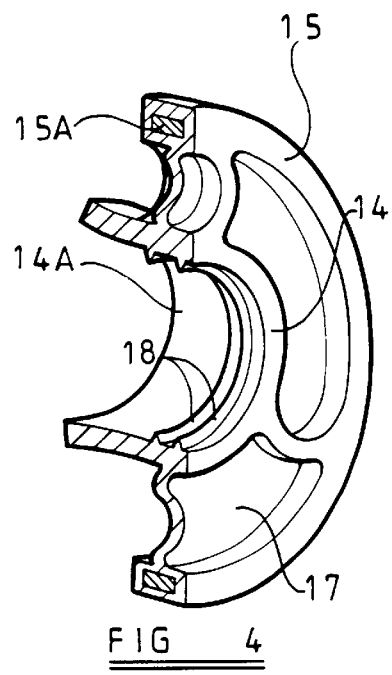
FIG. 4 is a partly sectioned perspective view of the seal of FIG. 3.

The seal 12 is illustrated in more detail in FIGS. 3 and 4 and can be seen to be of generally annular form with a central opening 13 defined by a stiff inner rim 14. A stiff outer rim 15 is joined to the inner rim 14 by three arcuate ribs 16. Whilst the inner and outer rims and ribs extend through the whole thickness of the material of the seal, areas between the ribs are significantly thinner, forming generally curvate membranes 17. In this particular embodiment, the internal peripheral surface of the rib 14 defining the opening 13 is provided with a pair of spaced parallel lips 18 of generally triangular cross-section which serve to enhance the sliding seal around the rod 7 in use. As can be seen more clearly from FIG. 4, the outer rim 15 is reinforced by an annular insert 15A of metal or plastics material which enhances the stiffness of this rim and thereby assists in retaining the ring firmly within the opening 8.

The inner rim 14 of the seal is provided with a skirt 14A which, in the illustrated rest position of the actuating lever 10, rests upon an upper surface of this lever so that, when the actuator 6 and rod 7 are detached from the brake housing 4, a complete seal exists around the opening 8 and at the lever, totally precluding ingress of foreign material into the housing 4 proper. Any such material falling into the recess 9 may readily be removed prior to refitting of the actuator to the housing. During actuating movement of the rod 7, the lever moves away from the skirt 14A, re-engaging it upon return to its rest position. The skirt may take any convenient alternative form to that shown, such as a bellows for example.

Figure 2A:
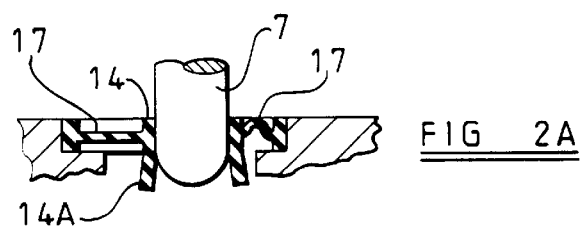
FIG. 2A is an enlarged detail of part of FIG. 2 in an alternative operative condition.

With the actuator assembled on the brake and the seal 12 in place sealing around the opening 8 and rod 7, the brake is actuated by supplying pneumatic or other fluid pressure to the actuator 6, causing the rod 7 to move outwardly of the actuator and pivot the actuating lever 10. As the rod moves outwardly, it slides through the seal 12 and may perform a slight angular movement due to the particular arcuate movement described by the lever 10. As can be seen from FIG. 2A, the seal around the rod is maintained during such angular movement by partial collapse of one or more of the webs 17 at the side towards which the rod 7 swings, corresponding straightening of one or more others of the webs taking place to maintain the inner rim 14 closely sealing against the rod 7. It will be appreciated that the particularly advantageous form of the seal 12 permits this action or corresponding action to occur, whatever may be the direction of swing of the rod 7 during its generally axial actuating movement.

Figure 5:
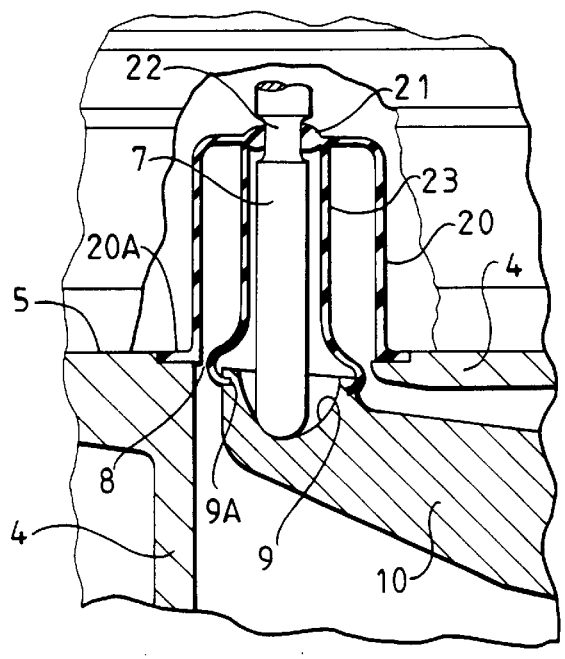
FIG. 5 is a detail of the brake and actuator incorporating an alternative embodiment of the seal.

In the alternative embodiment illustrated in FIG. 5, the sealing ring of the previous embodiment is replaced by a bellows type arrangement, of which an outer portion 20 has a radial flange 20A sealing within a recess formed in the upper surface 5 of the housing 4 and surrounding the opening 8, as before. The bellows portion 20 is joined to a thickened boss 21 engaged in sealing relationship within a recess 22 of the rod 7. An inner bellows portion 23 is also connected to the boss 21 and extends downwardly into permanent engagement with the actuating lever 10, engaging in a groove 9A at a location around the socket 9 thereof. It will be seen that the bellows portions deform during inward and outward movement of the rod 7 as the brake is actuated and released and a seal is maintained between the rod and both the housing 4 and actuator lever socket 9. When the actuator is removed from the housing 4, a small aperture remains within the boss 21 at the upper end of the bellows, once the rod 7 has been withdrawn therefrom, but this is relatively small and any foreign material passing therethrough can only enter the recess 9, as previously, and not the interior of the housing proper.

Figure 6:
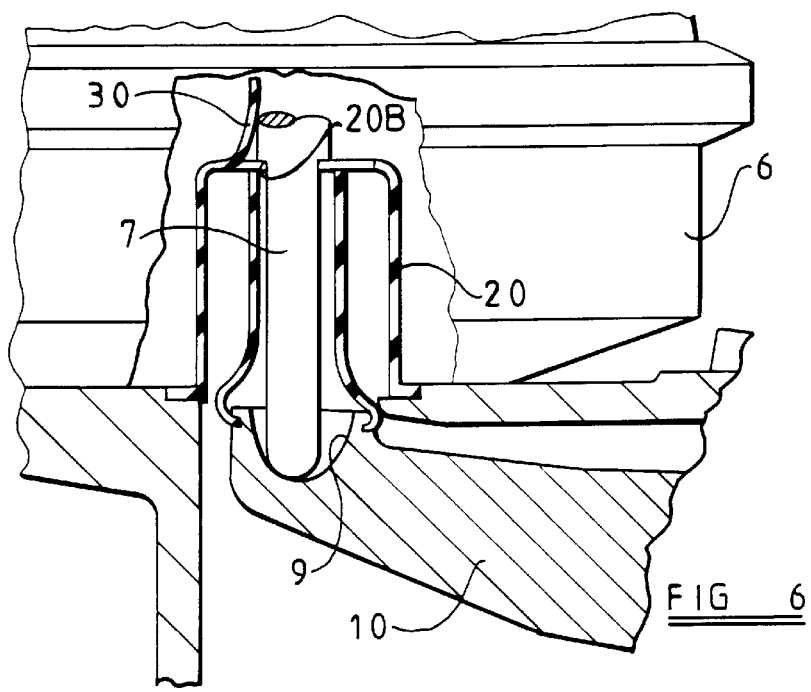
FIG. 6 is a view similar to FIG. 5 illustrating a slightly modified form of the seal of FIG. 5.

In order to provide additional protection for the interior of the brake housing when the actuator 6 is removed, the arrangement of FIG. 5 may be modified, as illustrated in FIG. 6, by the addition to the protective member 20 of a closure device in the form of a flap 30 which, with the brake and actuator assembled together lies adjacent to or against the actuator rod 7. The construction and function of the member 20 is the same as described previously in relation to FIG. 5, but when the actuator 6 is removed from the brake, inherent resilience of the flap 30 causes it to move downwardly to close the opening at the top of the member 20 and thereby preclude dirt falling through the device into the socket 9 of the lever 10. This embodiment is modified further in that the bellows portion 20 is located behind a shoulder 20B of the rod 7 and seals around the rod in this region. It will thus be seen that this version of the sealing device provides complete protection against foreign material entering the interior thereof when the actuator 6 is removed from the brake housing.

Figure 7:
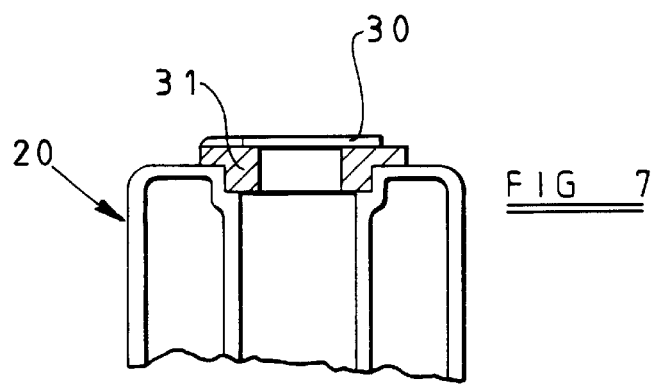
FIG. 7 is a diagrammatic view illustrating part of an alternative embodiment of the seal of FIG. 6.
Figure 8:
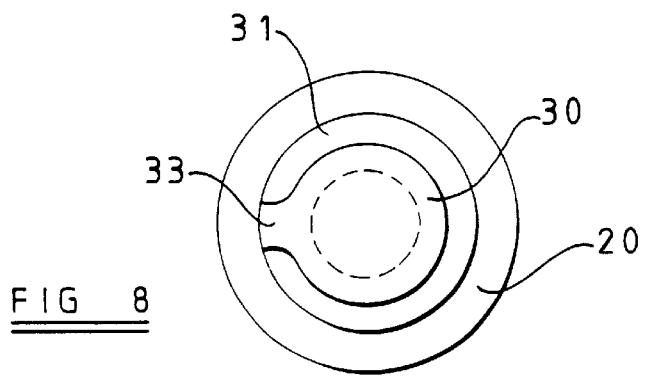
FIG. 8 is a view from above of the seal of FIG. 7.

FIGS. 7 and 8 illustrate a further example of a closure device applied to the sealing device 20. In this case, an insert 31, as of plastics material for example, is mounted around the top of the device 20 and incorporates a flap 30 hinged to the insert at 33. Inherent resilience in the flap or its hinge ensures that the flap assumes its illustrated closed position when the actuator rod 7 of the actuator 6 is not present within the sealing device. The insert is intended, in use, to lodge under the shoulder 20B and seal around the rod in this region. When the actuator 6 is assembled on the housing, as illustrated in FIG. 6, the flap is lifted to permit insertion of the rod 7 through the sealing device into the socket 9, in which condition the flap 32 would lie adjacent to or against the rod 7, in the manner illustrated in FIG. 6. Withdrawal of the rod 7 when the assembly is dismantled would permit the flap to close once more in order to seal the interior of the device 20. It will be understood that a flap or similar device may be applied to the embodiment of FIG. 5 or any other similar embodiment.

It will be seen that the invention provides a brake and actuator assembly incorporating simple and effective means of sealing the interior of the brake housing both when the assembly is intact and when the actuator is removed therefrom.

What is claimed is:

1. A brake and actuator assembly comprising a brake housing, an actuator device mounted on the housing, the actuator having a force transmission element extending through an opening in the housing and cooperating with an actuating member of the brake within the housing, the assembly incorporating a seal carried by the housing in a position such that it seals around both the opening and the force transmission element whilst permitting the latter to move in a direction longitudinally of the brake actuating member, the seal having a projecting annular skirt which searingly engages the actuating member only when the actuating member is in its inoperative rest position.

2. An assembly according to claim 1, wherein the seal permits the element limited angular movement whilst continuing to seal around the opening and element.

3. A brake and actuator assembly comprising a brake housing, an actuator device mounted on the housing, the actuator having a force transmission element extending through an opening in the housing and cooperating with an actuating member of the brake within the housing, the assembly incorporating a seal carried by the housing in a position such that it seals around both the opening and the force transmission element whilst permitting the latter to move in a direction longitudinally of the brake actuating member, the seal having a portion arranged for sealing engagement with the brake actuating member at least when the member is in its inoperative rest position, wherein the seal has a relatively stiff inner rim defining an opening which receives the transmission element in sliding sealing relationship, and a relatively stiff outer rim which seals around the housing opening, the inner and outer rims being interconnected by one or more relatively flexible portions which permit the element limited angular movement while the seal continues to seal around the opening and element.

4. An assembly according to claim 3, wherein the rims are generally annular and interconnected by generally radial ribs, the flexible portions being relatively thin webs extending between the rims and ribs.

5. An assembly according to claim 3, wherein the inner rim is provided internally with spaced lips serving to enhance the sliding seal around the element.

6. An assembly according to claim 3, wherein the outer rim is provided with additional reinforcing means.

* * * * *